US008880396B1

(12) United States Patent
Laroche et al.

(10) Patent No.: US 8,880,396 B1
(45) Date of Patent: Nov. 4, 2014

(54) SPECTRUM RECONSTRUCTION FOR AUTOMATIC SPEECH RECOGNITION

(75) Inventors: Jean Laroche, Santa Cruz, CA (US); Jordan Cohen, Half Moon Bay, CA (US)

(73) Assignee: Audience, Inc., Mountain View, CA (US)

( * ) Notice: Subject to any disclaimer, the term of this patent is extended or adjusted under 35 U.S.C. 154(b) by 281 days.

(21) Appl. No.: 12/860,515

(22) Filed: Aug. 20, 2010

Related U.S. Application Data

(60) Provisional application No. 61/329,008, filed on Apr. 28, 2010.

(51) Int. Cl.
*G10L 15/00* (2013.01)

(52) U.S. Cl.
USPC ............................ 704/233; 704/226; 704/228

(58) Field of Classification Search
CPC . G10L 21/02; G10L 21/0207; G10L 21/0208; G10L 21/0224; G10L 21/0232; G10L 25/27; G10L 2021/02; G10L 2021/0208; G10L 19/0017; G10L 19/0064; G10L 19/0076
USPC ......................................... 704/226–228, 233
See application file for complete search history.

(56) References Cited

U.S. PATENT DOCUMENTS 5,204,906 A * 4/1993 Nohara et al. ................ 704/207
5,400,409 A * 3/1995 Linhard .......................... 381/92
5,598,505 A * 1/1997 Austin et al. .................. 704/226
6,202,047 B1 * 3/2001 Ephraim et al. ........... 704/256.6
6,263,307 B1 * 7/2001 Arslan et al. .................. 704/226
6,772,117 B1 * 8/2004 Laurila et al. ................. 704/233
8,046,219 B2 * 10/2011 Zurek et al. .................... 704/233
8,194,882 B2 * 6/2012 Every et al. .................. 381/94.1
2008/0140396 A1 * 6/2008 Grosse-Schulte et al. .... 704/227
2008/0192956 A1 * 8/2008 Kazama ........................ 381/94.3
2009/0106021 A1 * 4/2009 Zurek et al. .................... 704/226
2009/0144058 A1 * 6/2009 Sorin ............................ 704/250
2009/0257609 A1 * 10/2009 Gerkmann et al. ........... 381/317

OTHER PUBLICATIONS

Raj, B., 2000. Reconstruction of incomplete spectrograms for robust speech recognition. PhD thesis, Carnegie Mellon University, Pittsburgh, Pennsylvania.*
B. Ramakrishnan, 2000. Reconstruction of incomplete spectrograms for robust speech recognition. PhD thesis, Carnegie Mellon University, Pittsburgh, Pennsylvania.*
Wooil Kim; Hansen, J.; , "Missing-Feature Reconstruction by Leveraging Temporal Spectral Correlation for Robust Speech Recognition in Background Noise Conditions," Audio, Speech, and Language Processing, IEEE Transactions on , vol. 18, No. 8, pp. 2111-2120, Nov. 2010.*
M. Cook, P. Green, L. Josifovski, and A. Vizinho, "Robust automatic speech recognition with missing and unreliable acoustic data," Speech Commun., vol. 34, No. 3, pp. 267-285, 2001.*

(Continued)

*Primary Examiner* — Richemond Dorvil
*Assistant Examiner* — Ernest Estes
(74) *Attorney, Agent, or Firm* — Carr & Ferrell LLP

(57) ABSTRACT

The present technology provides techniques for transform domain reconstruction of noise-corrupted portions of an acoustic signal to emulate speech which is obscured by the noise. Replacement transform values for the noise-corrupted portions are determined utilizing the portions of the acoustic signal which contain speech.

18 Claims, 8 Drawing Sheets

(56) References Cited

OTHER PUBLICATIONS

Liu, Fu-Hua, et al. "Efficient cepstral normalization for robust speech recognition." Proceedings of the workshop on Human Language Technology. Association for Computational Linguistics, 1993.*

Yoshizawa, Shingo, et al. "Cepstral gain normalization for noise robust speech recognition." Acoustics, Speech, and Signal Processing, 2004. Proceedings.(ICASSP'04). IEEE International Conference on. vol. 1. IEEE, 2004.*

* cited by examiner

SPECTRUM RECONSTRUCTION FOR AUTOMATIC SPEECH RECOGNITION

CROSS REFERENCE TO RELATED APPLICATIONS

This application claims the benefit of U.S. Provisional Application No. 61/329,008, filed on Apr. 28, 2010, entitled "Spectral Reconstruction for ASR", which is incorporated by reference herein.

BACKGROUND

1. Field of the Invention

The present invention relates generally to audio processing, and more particularly to transform domain reconstruction of an acoustic signal that can improve the accuracy of automatic speech recognition systems in noisy environments.

2. Description of Related Art

An automatic speech recognition (ASR) system in an audio device can be used to recognize spoken words, or phonemes within the words, in order to identify spoken commands by a user. The ASR system takes an acoustic signal and carries out an analysis to extract speech parameters or "features" of the acoustic signal. These features are then compared to a corresponding set of features of known speech to determine the spoken command. The ASR system typically relies upon recognition models of known speech which have been trained on a speech collection from various speakers.

A specific issue arising in ASR concerns how to adapt the recognition models to different acoustic environments. In particular, the accuracy of the ASR system typically depends on the appropriateness of the recognition models it relies upon. For example, if the ASR system uses recognition models built using speech collected in a quiet environment, using these speech models to perform speech recognition in a noisy environment can result in poor recognition accuracy. One approach to improving recognition accuracy is to retrain the recognition models using new speech collected in the noisy environment. However, to ensure reasonable recognition performance, a large amount of new speech typically needs to be collected. Such an approach is time consuming, and in many instances is not practical.

A noise reduction system in the audio device can reduce background noise to improve voice quality in the acoustic signal from the perspective of a listener. The noise reduction system may extract and track speech characteristics such as pitch and level in the acoustic signal to build speech and noise models. These speech and noise models are used to generate a signal modification that strongly attenuates the parts of the acoustic signal that are dominated by noise, and preserves the parts that are dominated by speech.

Although the noise reduction system can improve voice quality from the perspective of a listener, strongly attenuating parts of the acoustic signal can be problematic for the ASR system. Specifically, after attenuation, the transform domain representation of the acoustic signal may not be similar to that of speech. As a result, the extracted features of the attenuated acoustic signal may not closely match those expected by the recognition models, resulting in possible recognition errors by the ASR system. In some instances, the attenuation may corrupt the extracted features more than the original noise would have, which causes the speech recognition performance of the ASR system to worsen rather than get better.

It is desirable to provide techniques for improving the accuracy of ASR systems in noisy environments.

SUMMARY

The present technology provides techniques for transform domain reconstruction of noise-corrupted portions of an acoustic signal to emulate speech which is obscured by the noise. Replacement transform values for the noise-corrupted portions are determined utilizing the portions of the acoustic signal which contain speech. The replacement transform values may be determined utilizing features such as cepstral coefficients extracted from the portions which contain speech. The extracted features may then be applied to the transform domain represented by the noise-corrupted portions to emulate the obscured speech. The replacement transform values may alternatively be determined through the use of a probabilistic model or a codebook based on the characteristics of the portions which contain speech. By reconstructing the noise-corrupted portions based on the speech portions rather than suppressing them, the noise-corrupted portions can more closely resemble natural speech. The reconstructed portions and the original speech portions may then be used for feature extraction in an ASR system to perform speech recognition. In doing so, the transform domain reconstruction techniques described herein can improve the accuracy of the ASR system in noisy environments. The techniques described herein can also be used to perform noise reduction within the acoustic signal to improve voice quality from the perspective of a listener, or to compute front end parameters for an ASR system directly.

A method for transform domain reconstruction of an acoustic signal as described herein includes receiving an acoustic signal having a speech component and a noise component. The acoustic signal is transformed into a plurality of transform domain components having corresponding transform values. A first set of transform domain components in the plurality of transform domain components are identified as having transform values which are based on the speech component. Transform values of a second set of transform domain components not identified as being based on the speech component are replaced with replacement transform values to emulate the speech component. The replacement transform values are based on the transform values of the first set of transform domain components.

A system for transform domain reconstruction of an acoustic signal as described herein includes a microphone to receive an acoustic signal having a speech component and a noise component. The system further includes a transform module to transform the acoustic signal into a plurality of transform domain components having corresponding transform values. The system further includes a reconstructor module that identifies a first set of transform domain components in the plurality of transform domain components having transform values which are based on the speech component. The transform module replaces transform values of a second set of transform domain components not identified as being based on the speech component with replacement transform values. The replacement transform values are based on the transform values of the first set of transform domain components.

A computer readable storage medium as described herein has embodied thereon a program executable by a processor to perform a method for transform domain reconstruction of an acoustic signal as described above.

Other aspects and advantages of the present invention can be seen on review of the drawings, the detailed description, and the claims which follow.

DETAILED DESCRIPTION

The present technology provides techniques for transform domain reconstruction of noise-corrupted portions of an acoustic signal to emulate speech which is obscured by the noise. Replacement transform values for the noise-corrupted portions are determined utilizing the portions of the transform which are dominated by speech. The replacement transform values may be determined utilizing features such as cepstral coefficients extracted from the portions which contain speech. The extracted features may then be applied to the transform domain represented by the noise-corrupted portions to emulate the obscured speech. The replacement transform values may alternatively be determined through the use of a probabilistic model or a codebook based on the characteristics of the portions which contain speech.

By reconstructing the noise-corrupted portions based on the speech portions rather than suppressing them, the noise-corrupted portions can more closely resemble natural speech. The reconstructed portions and the original speech portions may then be used for feature extraction in an ASR system to perform speech recognition of the acoustic signal. In doing so, the transform domain reconstruction techniques described herein can improve the accuracy of the ASR system in noisy environments. The reconstruction techniques described herein can also be used to perform noise reduction within the acoustic signal to improve voice quality.

Embodiments of the present technology may be practiced on any audio device that is configured to receive and/or provide audio such as, but not limited to, cellular phones, phone handsets, headsets, and conferencing systems. While some embodiments of the present technology will be described in reference to operation on a cellular phone, the present technology may be practiced on any audio device.

Figure 1:
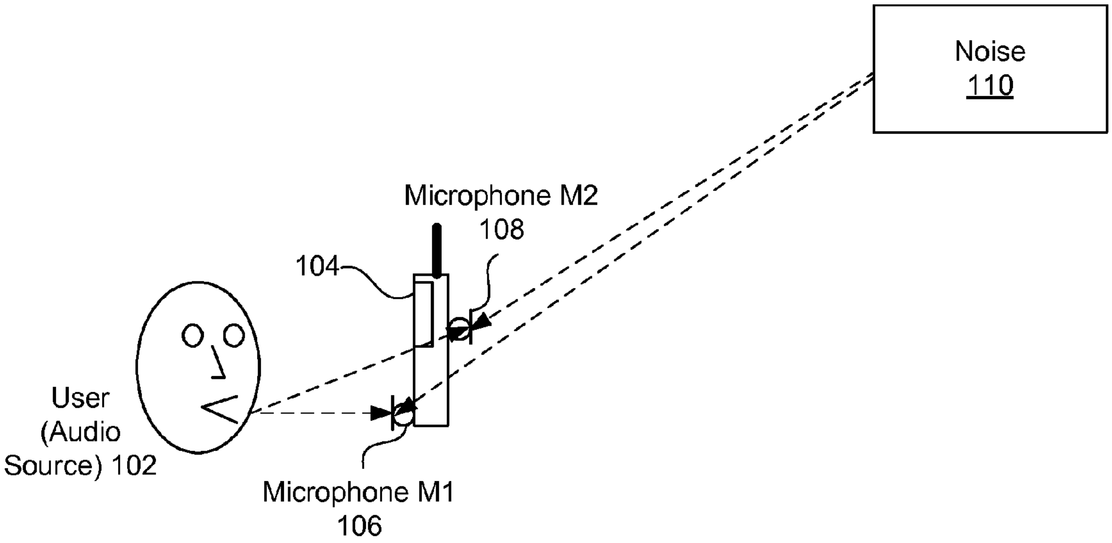
FIG. 1 is an illustration of an environment in which embodiments of the present technology may be used.

FIG. 1 is an illustration of an environment in which embodiments of the present technology may be used. A user 102 may act as an audio (speech) source to an audio device 104. The exemplary audio device 104 includes two microphones: a primary microphone 106 relative to the user 102 and a secondary microphone 108 located a distance away from the primary microphone 106. Alternatively, the audio device 104 may include a single microphone. In yet other embodiments, the audio device 104 may include more than two microphones, such as for example three, four, five, six, seven, eight, nine, ten or even more microphones.

The primary microphone 106 and secondary microphone 108 may be omni-directional microphones. Alternatively embodiments may utilize other forms of microphones or acoustic sensors.

While the microphones 106 and 108 receive sound (i.e. acoustic signals) from the user 102, the microphones 106 and 108 also pick up noise 110. Although the noise 110 is shown coming from a single location in FIG. 1, the noise 110 may include any sounds from one or more locations that differ from the location of user 102, and may include reverberations and echoes. The noise 110 may be stationary, non-stationary, and/or a combination of both stationary and non-stationary noise.

The total signal received by the primary microphone 106 (referred to herein as the primary acoustic signal c(t)) may be represented as a superposition of a speech component s(t) from the user 102, and a noise component n(t) from noise 110. This may be represented mathematically as $c(t)=s(t)+n(t)$.

Due to the spatial separation of the primary microphone 106 and the secondary microphone 108, the speech component from the user 102 received by the secondary microphone 108 may have an amplitude difference and a phase difference relative to the speech component received by the primary microphone 106. Similarly, the noise component received by the secondary microphone 108 may have an amplitude difference and a phase difference relative to the noise component n(t) received by the primary microphone 106. These amplitude and phase differences can be represented by complex coefficients. Therefore, the total signal received by the secondary microphone 108 (referred to herein as the secondary acoustic signal f(t)) may be represented as a superposition of the speech component s(t) scaled by a first complex coefficient $\sigma$ and the noise component n(t) scaled by a second complex coefficient $\upsilon$. This can be represented mathematically as $f(t)=\sigma s(t)+\upsilon n(t)$. In other words, the secondary acoustic signal f(t) is a mixture of the speech component s(t) and noise component n(t) of the primary acoustic signal c(t), where both the speech component $\sigma s(t)$ and noise component $\upsilon n(t)$ of the secondary acoustic signal f(t) may be independently scaled in amplitude and shifted in phase relative to those components of the primary acoustic signal c(t). It should be noted that diffuse noise components d(t) and e(t) may also be present in both the primary and secondary acoustic signals c(t) and f(t). In such a case, the primary acoustic signal may be represented as $c(t)=s(t)+n(t)+d(t)$, while the secondary acoustic signal may be represented as $f(t)=\sigma s(t)+\upsilon n(t)+e(t)$.

These amplitude and phase differences may be used to discriminate speech and noise in the transform domain. Because the primary microphone 106 is much closer to the user 102 than the secondary microphone 108, the intensity level is higher for the primary microphone 106, resulting in a larger energy level received by the primary microphone 106 during a speech/voice segment, for example. Further embodiments may use a combination of energy level differences and time delays to discriminate speech. Based on binaural cue encoding, speech signal extraction or speech enhancement may be performed.

As described below, the audio device 104 transforms the primary acoustic signal c(t) into a transform domain representation comprising a plurality of transform domain components having corresponding transform coefficients. These transform domain components are referred to herein as primary sub-band frame signals c(k) having corresponding transform coefficients S(k). The primary sub-band frame signals c(k) may for example be in the fast cochlea transform (FCT) domain, or as another example in the fast Fourier transform (FFT) domain. Other transform domain representations may alternatively be used.

The primary sub-band frame signals c(k) are then analyzed to determine those which are due to the noise component n(t) (referred to herein as the noise-corrupted sub-band signals $c_n(k)$), and those which are due to the speech component s(t) (referred to herein as the speech sub-band signals $c_s(k)$). The transform values of the noise-corrupted sub-band signals $c_n(k)$ are then reconstructed (i.e. replaced) to emulate speech which is obscured by the noise component n(t), based on the transform values of the speech sub-band signals $c_s(k)$. The speech sub-band signals $c_s(k)$ and the reconstructed sub-band signals $c'_n(k)$ can then be used for feature extraction in an ASR system to perform speech recognition.

By reconstructing the noise-corrupted sub-band signals $c_n(k)$ to emulate speech rather than suppressing them, the reconstructed sub-band signals $c'_n(k)$ can more closely resemble natural speech. The reconstructed sub-band signals $c'_n(k)$ and the speech sub-band signals $c_s(k)$ can then be inverse transformed back into the time domain, and the result used by an ASR module in the audio device 104 to perform speech recognition. In doing so, the transform domain reconstruction techniques described herein can improve the accuracy of the ASR system in noisy environments. The transform domain reconstruction techniques described herein can also be used to perform noise reduction to improve voice quality within the primary acoustic signal c(t). A noise reduced acoustic signal may then be transmitted by the audio device 104, and/or provided as an audio output to the user 102.

Figure 2:
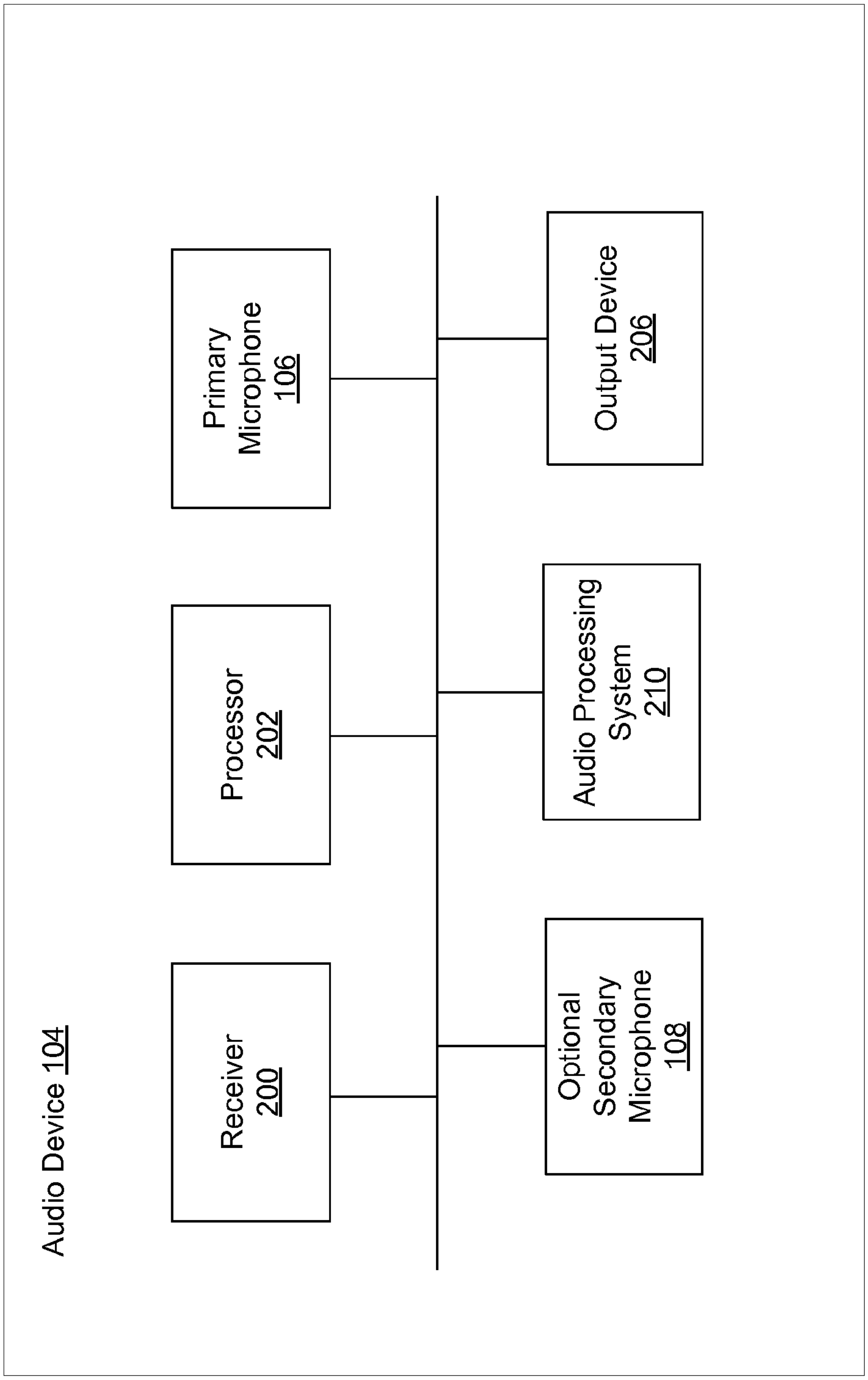
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, the optional secondary microphone 108, an audio processing system 210, and an output device 206. The audio device 104 may include further or other components necessary for audio device 104 operations. Similarly, the audio device 104 may include fewer components that perform similar or equivalent functions to those depicted in FIG. 2.

Processor 202 may execute instructions and modules stored in a memory (not illustrated in FIG. 2) in the audio device 104 to perform functionality described herein, including transform domain reconstruction of the primary acoustic signal c(t). Processor 202 may include hardware and software implemented as a processing unit, which may process floating point operations and other operations for the processor 202.

The exemplary receiver 200 is an acoustic sensor configured to receive a signal from a communications network. In some embodiments, the receiver 200 may comprise an antenna device. The signal may then be forwarded to the audio processing system 210 to reduce noise and/or perform speech recognition using the techniques described herein, and provide a noise reduced audio signal to the output device 206. The present technology may be used in one or both of the transmit and receive paths of the audio device 104.

The audio processing system 210 is configured to receive the primary acoustic signal c(t) from the primary microphone and the optional secondary acoustic signal f(t) from the secondary microphone 108, and process the acoustic signals. Processing includes performing transform domain reconstruction of the primary acoustic signal c(t) as described herein. The audio processing system 210 is discussed in more detail below.

The acoustic signals received by the primary microphone 106 and the secondary microphone 108 may be converted into electrical signals. The electrical signals may themselves be converted by an analog-to-digital converter (not shown) into digital signals for processing in accordance with some embodiments. It should be noted that embodiments of the technology described herein may be practiced utilizing only the primary microphone 106.

The output device 206 is any device which provides an audio output to the user 102. For example, the output device 206 may include a speaker, an earpiece of a headset or handset, or a speaker on a conference device.

In various embodiments, where the primary and secondary microphones 106, 108 are omni-directional microphones that are closely-spaced (e.g., 1-2 cm apart), a beamforming technique may be used to simulate forwards-facing and backwards-facing directional microphones. The level difference may be used to discriminate speech and noise in the time-frequency domain which can be used in the transform domain reconstructions.

Figure 3:
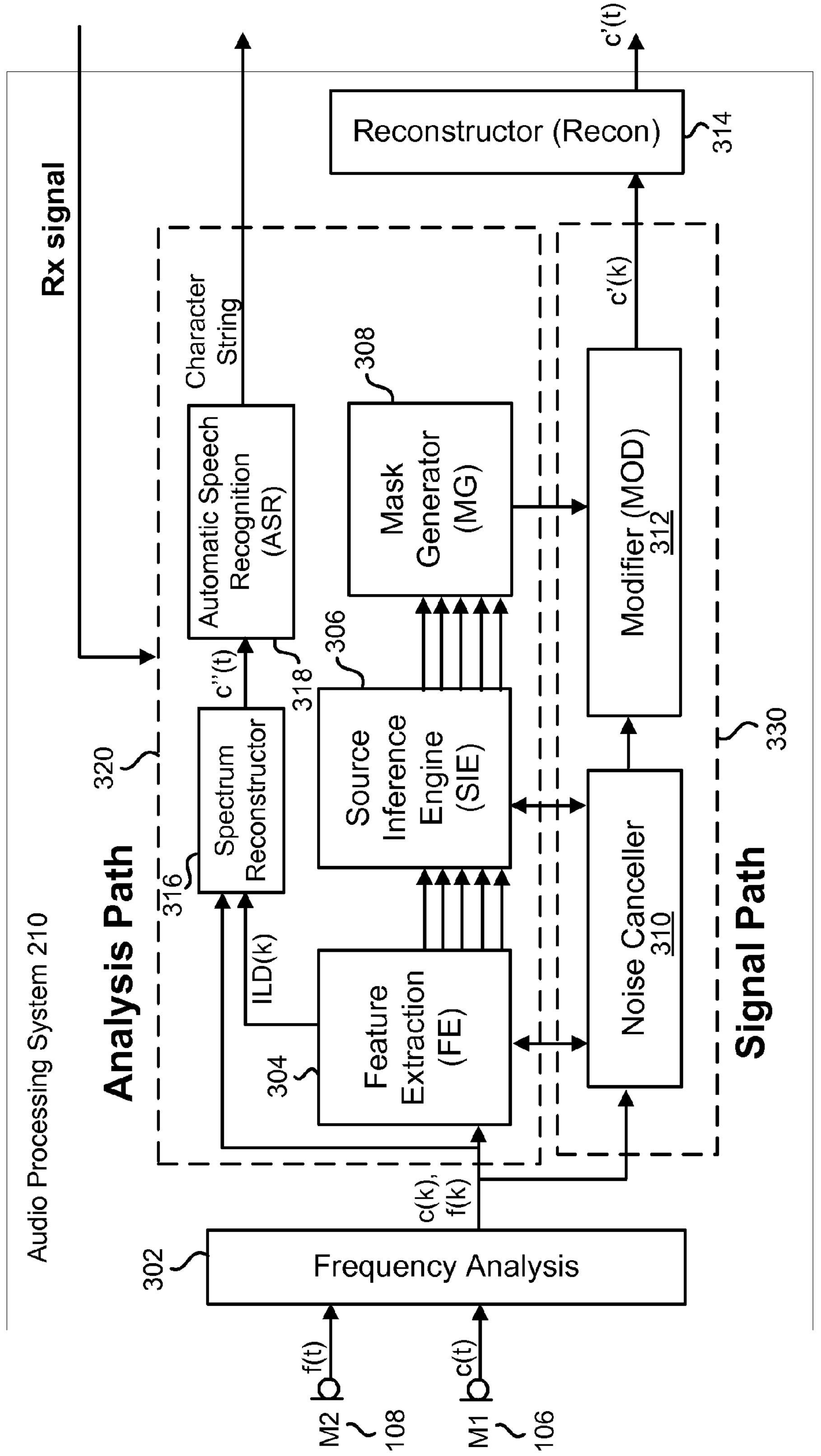
FIG. 3 is a block diagram of an exemplary audio processing system for performing transform domain reconstruction as described herein.

FIG. 3 is a block diagram of an exemplary audio processing system 210 for performing transform domain reconstruction of the primary acoustic signal c(t) as described herein. In exemplary embodiments, the audio processing system 210 is embodied within a memory device within audio device 104.

The audio processing system 210 may include a frequency analysis module 302, a feature extraction module 304, source inference engine module 306, mask generator module 308, noise canceller module 310, modifier module 312, reconstructor module 314, spectrum reconstructor module 316, and automatic speech recognition (ASR) module 318. Audio processing system 210 may include more or fewer components than those illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number and type of signals communicated between modules.

In operation, the primary acoustic signal c(t) received from the primary microphone 106 and the secondary acoustic signal f(t) received from the secondary microphone 108 are converted to electrical signals. Each of the electrical signals is processed through frequency analysis module 302 to transform the electrical signals into a corresponding transform domain representation. In one embodiment, the frequency analysis module 302 takes the acoustic signals and mimics the frequency analysis of the cochlea (e.g., cochlear domain), simulated by a filter bank, for each time frame. The frequency analysis module 302 separates each of the primary acoustic signal c(t) and the secondary acoustic signal f(t) into two or more frequency sub-band signals having corresponding transform values. A sub-band signal is the result of a filtering operation on an input signal, wherein the bandwidth of the filter is narrower than the bandwidth of the signal received by the frequency analysis module 302. Alternatively, other filters such as short-time Fourier transform (STFT), sub-band filter banks, modulated complex lapped transforms, cochlear models, wavelets, etc., can be used for the analysis and synthesis.

Because most sounds (e.g. acoustic signals) are complex and include more than one frequency, a sub-band analysis on the acoustic signal determines what individual frequencies are present in each sub-band of the complex acoustic signal during a frame (e.g. a predetermined period of time). For example, the length of a frame may be 4 ms, 8 ms, or some other length of time. In some embodiments there may be no frame at all. The results may include sub-band signals in a fast cochlea transform (FCT) domain. The sub-band frame signals of the primary acoustic signal c(t) are expressed as c(k), and the sub-band frame signals of the secondary acoustic signal f(t) are expressed as f(k).

The sub-band frame signals c(k) and f(k) are provided from frequency analysis module 302 to an analysis path sub-system 320 and to a signal path sub-system 330. The analysis path sub-system 320 may process the sub-band frame signals to identify signal features, distinguish between speech components and noise components, perform transform domain reconstruction of noise-corrupted portions, and generate a signal modifier. The signal path sub-system 330 is responsible for modifying primary sub-band frame signals c(k) by subtracting noise components and applying a modifier, such as one or more multiplicative gain masks and/or subtractive operations generated in the analysis path sub-system 320. The modification may reduce noise and preserve the desired speech components in the sub-band signals. The analysis path sub-system 330 is described in more detail below.

Signal path sub-system 330 includes noise canceller module 310 and modifier module 312. Noise canceller module 310 receives sub-band frame signals c(k) and f(k) from frequency analysis module 302. Noise canceller module 310 may subtract (i.e. cancel) a noise component from one or more primary sub-band frame signals c(k). As such, noise canceller module 310 may output sub-band estimates of noise components and sub-band estimates of speech components in the form of noise subtracted sub-band signals.

Noise canceller module 310 can provide noise cancellation for two-microphone configurations, for example based on source location, by utilizing a subtractive algorithm. It can also be used to provide echo cancellation. By performing noise and echo cancellation with little to no voice quality degradation, noise canceller module 310 may increase the speech-to-noise ratio (SNR) in sub-band signals received from the frequency analysis module 302 and provided to the modifier module 312 and post filtering modules.

An example of noise canceller performed in some embodiments by the noise canceller module 310 is disclosed in U.S. patent application Ser. No. 12/215,980, entitled "System and Method for Providing Noise Suppression Utilizing Null Processing Noise Subtraction," filed Jun. 30, 2008, U.S. patent application Ser. No. 12/422,917, entitled "Adaptive Noise Cancellation," filed Apr. 13, 2009, and U.S. patent application Ser. No. 12/693,998, entitled "Adaptive Noise Reduction Using Level Cues," filed Jan. 26, 2010, the disclosures of which each are incorporated by reference.

The modifier module 312 receives the noise subtracted primary sub-band frame signals from the noise canceller module 310. The modifier module 312 multiplies the noise subtracted primary sub-band frame signals with echo and/or noise masks provided by the analysis path sub-system 320 (described below). Applying the masks reduces the energy levels of noise and/or echo components to form masked sub-band frame signals c'(k).

Reconstructor module 314 may convert the masked sub-band frame signals c'(k) from the cochlea domain back into the time domain to form a synthesized time domain noise and/or echo reduced acoustic signal c'(t). The conversion may include adding the masked frequency sub-band signals c'(k) and may further include applying gains and/or phase shifts to the sub-band signals prior to the addition. Once conversion to the time domain is completed, the synthesized time-domain acoustic signal c'(t), wherein the noise and echo have been reduced, may be provided to a codec for encoding and subsequent transmission by the audio device 104 to a far-end environment via a communications network.

In some embodiments, additional post-processing of the synthesized time-domain acoustic signal c'(t) may be performed. For example, comfort noise generated by a comfort noise generator module may be added to the synthesized time-domain acoustic signal c'(t) prior to providing the signal to the user 102 or another listener.

Feature extraction module 304 of the analysis path sub-system 320 receives the sub-band frame signals c(k) and f(k) provided by frequency analysis module 302. Feature extraction module 304 also receives the output of the noise canceller module 310 and may compute frame energy estimations of the sub-band frame signals, sub-band inter-microphone level difference (sub-band ILD(k)) between the primary acoustic signal c(t) and the secondary acoustic signal f(t) in each sub-band, sub-band inter-microphone time differences (sub-band ITD(k)) and inter-microphone phase differences (sub-band IPD(k)) between the primary acoustic signal c(t) and the secondary acoustic signal f(t), and self-noise estimates of the primary microphone 106 and secondary microphone 108. The feature extraction module 304 may also compute monaural or binaural features which may be required by other modules, such as pitch estimates and cross-correlations between microphone signals. Feature extraction module 304 may provide both inputs to and process outputs from noise canceller module 310.

Determining energy levels and ILDs is discussed in more detail in U.S. patent application Ser. No. 11/343,524, entitled "System and Method for Utilizing Inter-Microphone Level Differences for Speech Enhancement", and U.S. patent application Ser. No. 12/832,920, entitled "Multi-Microphone Robust Noise Suppression", the disclosures of which each are incorporated by reference.

As described in more detail below, the spectrum reconstructor module 316 receives the sub-band ILD(k) and the primary sub-band signals c(k). The spectrum reconstructor module 316 uses the sub-band ILD(k) to identify noise-corrupted sub-band signals and perform transform domain reconstruction as described herein. The spectrum reconstructor module 316 and the ASR module 318 are discussed below.

Source inference engine module 306 may process the frame energy estimations to compute noise estimates and may derive models of the noise and speech in the sub-band signals. Source inference engine module 306 adaptively estimates attributes of the acoustic sources, such as their energy spectra of the output signal of the noise canceller module 310. The energy spectra attribute may be used to generate a multiplicative mask in mask generator module 308.

An example of tracking clusters by a cluster tracker module is disclosed in U.S. patent application Ser. No. 12/004,897, entitled "System and Method for Adaptive Classification of Audio Sources," filed on Dec. 21, 2007, the disclosure of which is incorporated herein by reference.

The mask generator module 308 receives models of the sub-band speech components and noise components as estimated by the source inference engine module 306. Noise estimates of the noise spectrum for each sub-band signal may be subtracted out of the energy estimate of the primary spectrum to infer a speech spectrum. Mask generator module 308 may determine a gain mask for the noise-subtracted sub-band frame signals and provide the gain mask to modifier module 312. As described above, the modifier module 312 multiplies the gain masks to the noise-subtracted sub-band frame signals to form masked sub-band frame signals c'(k). Applying the mask reduces energy levels of noise components in the sub-band signals of the primary acoustic signal and thereby performs noise reduction.

An example of the gain mask output from mask generator module 308 is disclosed in U.S. patent application Ser. No. 12/832,901, entitled "Method for Jointly Optimizing Noise Reduction and Voice Quality in a Mono or Multi-Microphone System," filed Jul. 8, 2010, the disclosure of which is incorporated herein by reference.

The system of FIG. 3 may process several types of signals processed by an audio device. The system may be applied to acoustic signals received via one or more microphones. The system may also process signals, such as a digital Rx signal, received through an antenna or other connection.

As mentioned above, the spectrum reconstructor module 316 receives the sub-band ILD(k) and the primary sub-band signals c(k). In the illustrated embodiment the sub-band ILD (k) is used to determine which of the primary sub-band frame signals c(k) are due to the noise component n(t) (referred to herein as the noise-corrupted sub-band signals $c_n(k)$), and those which are due to the speech component s(t) (referred to herein as the speech sub-band signals $c_s(k)$). This can be represented mathematically as $c(k)=c_n(k)+c_s(k)$. In other words, the transform values S(k) of the primary sub-band frame signals c(k) is a superposition of noise-corrupted transform values $S_n(k)$ of the noise-corrupted sub-band signals $c_n(k)$, and speech transform values $S_s(k)$ of the speech sub-band signals $c_s(k)$. This can be represented mathematically as $S(k)=S_n(k)+S_s(k)$.

The noise-corrupted transform values $S_n(k)$ of the noise-corrupted sub-band signals $c_n(k)$ are then reconstructed to form reconstructed sub-band signals $c'_n(k)$ having reconstructed transform values $S'_n(k)$ which emulate speech. As described below, the reconstructed transform values $S'_n(k)$ are based on the speech transform values $S_s(k)$ of the speech sub-band signals $c_s(k)$. The speech sub-band signals $c_s(k)$ and the reconstructed sub-band signals $c'_n(k)$ are then used to perform a transformation back into the time-domain to form modified acoustic signal c"(t).

The ASR module 318 receives the modified acoustic signal c"(t) from the spectrum reconstructor module 316. The ASR module 318 performs a speech recognition analysis of the modified acoustic signal c"(t) to recognize an utterance of speech. The ASR module 318 then outputs a character string such as words or text or instructions for the recognized utterance. The character string may be utilized for further processing by the audio device 104, such as to carry out commands or operations.

An example of the speech recognition analysis which may be carried out by the ASR module 318 is disclosed in U.S. Pat. No. 7,319,959, entitled "Multi-Source Phoneme Classification for Noise-Robust Automatic Speech Recognition," which is incorporated herein by reference.

Figure 4A:
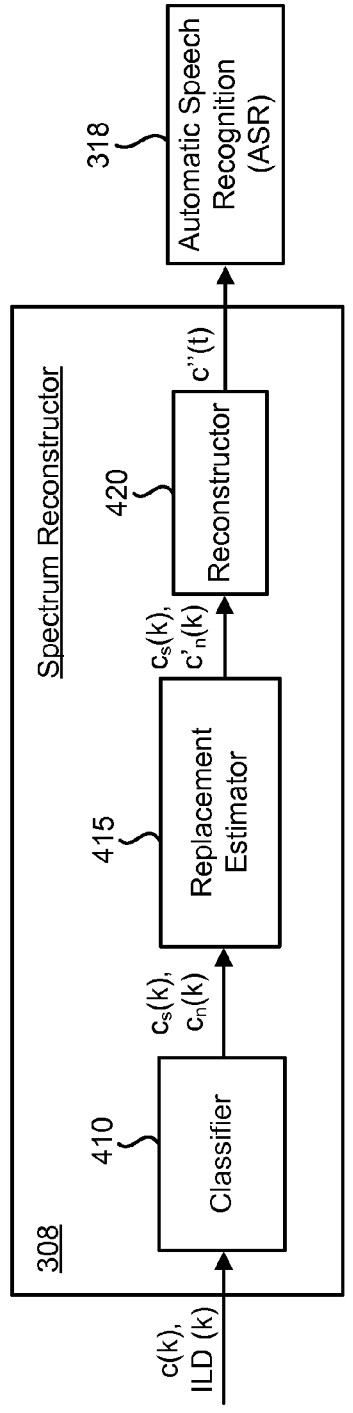
FIG. 4A is a first block diagram of an exemplary spectrum reconstruction module for transform domain reconstruction.

FIG. 4A is a first block diagram of an exemplary spectrum reconstructor module 316. The spectrum reconstructor module 316 includes a classifier module 410, a replacement estimator module 415, and a reconstructor module 420. The spectrum reconstructor module 316 may include more or fewer components than those illustrated in FIG. 4A, and the functionality of modules may be combined or expanded into fewer or additional modules.

The classifier module 410 receives the sub-band ILD(k) and the primary sub-band frame signals c(k). The classifier module 410 determines the noise-corrupted sub-band signals $c_n(k)$ and the speech sub-band signals $c_s(k)$ within the primary sub-band frame signals c(k).

In the illustrated embodiment, the determination of whether a primary sub-band frame signal c(k) is noise-corrupted is based on the ILD(k) for that sub-band. For example, if the magnitude of a sub-band ILD(k) is below a particular threshold value, the corresponding primary sub-band frame signal c(k) is classified as a noise corrupted sub-band signal $c_n(k)$. Otherwise, the corresponding primary sub-band frame signal c(k) is classified as a speech sub-band signal $c_s(k)$.

In some alternative embodiments, rather than a binary determination of whether to classify a primary sub-band signal c(k) as speech or noise-corrupted, a continuously valued characterization may used to indicate the extent of noise present in the primary sub-band signal c(k). The continuously valued characterization can then be used to weight the primary sub-band signals c(k) when computing replacement transform values $S'_n(k)$ and performing transform domain reconstruction as described herein. For example, an index value for a corresponding primary sub-band signal c(k) may be determined based on the magnitude of its sub-band ILD (k). In one embodiment, the index value has a value of 0 (i.e. completely corrupted by noise) if the sub-band ILD(k) of the corresponding primary sub-band frame signal c(k) is below a relatively low threshold value, and has a value of 1 (i.e completely dominated by speech) if it is above a relatively high threshold value.

Alternatively, other techniques may be used to determine whether to classify a primary sub-band frame signal c(k) as speech or noise-corrupted. For example, the determination may be made based on estimated speech-to-noise ratio (SNR) for that sub-band. In such a case, the spectrum reconstructor module 420 may include an SNR estimator module which calculates instantaneous SNR as a function of long-term peak speech energy to instantaneous noise energy. The long-term peak speech energy may be determined using one or more mechanisms based upon the input instantaneous speech power estimate and noise power estimate provided from source inference engine module 306. The mechanisms may include a peak speech level tracker, average speech energy in the highest x dB of the speech signal's dynamic range, reset the speech level tracker after a sudden drop in speech level, e.g. after shouting, apply lower bound to speech estimate at low frequencies (which may be below the fundamental component of the talker), smooth speech power and noise power across sub-bands, and add fixed biases to the speech power estimates and SNR so that they match the correct values for a set of oracle mixtures.

Figure 5:
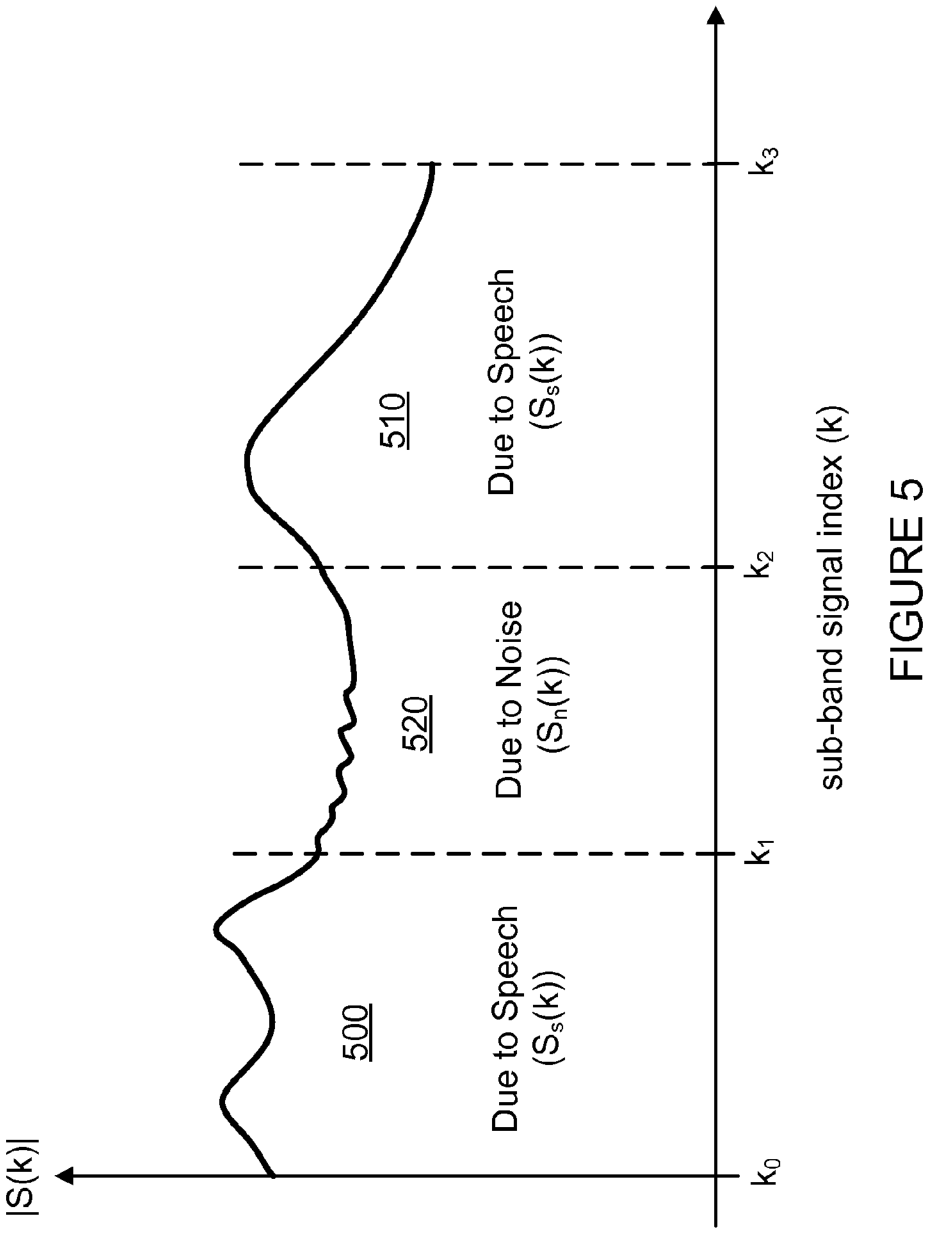
FIG. 5 illustrates an example of transform values of an acoustic signal in a particular time frame.

FIG. 5 illustrates an example of transform values S(k) for the primary sub-band frame signals c(k) in a particular time frame. In the example in FIG. 5, noise-corrupted transform values $S_n(k)$ correspond to sub-band frame signals $c(k_1)$ to $c(k_2)$ which have been classified as noise-corrupted sub-band signals $c_n(k)$. The speech transform values $S_s(k)$ correspond to the remaining sub-band frame signals c(k), which have been classified as speech sub-band signals $c_s(k)$.

In the illustrated example, two regions 500, 510 of the spectrum of the primary sub-band frame signals c(k) have been classified as speech sub-band signals $c_s(k)$, and one region 520 has been classified as noise-corrupted sub-band signals $c_n(k)$. The primary sub-band frame signals c(k) which are classified as speech and noise depends upon the characteristics of the received primary acoustic signal c(t), and thus can be different from that illustrated in FIG. 5. In addition, the primary sub-band frame signals c(k) which are classified as speech and noise can change over time, including from one frame to the next.

In FIG. 5, a continuous representation of transform values S(k) versus sub-band signal index (k) is illustrated, although the underlying transform values S(k) themselves may be discrete. In other words, the illustrated continuous representation is not intended to limit the transform domain reconstruction techniques described herein to continuous transforms. In exemplary embodiments, the transform values S(k) versus sub-band signal index (k) is a discrete transform, which may for example have between 40 and 200 discrete points. The number of discrete points may depend on whether or not the spectrum is warped into a bark scale. The number of discrete points may depend on the type of transform domain representation used, and can vary from embodiment to embodiment.

Referring back to FIG. 4A, the replacement estimator module 415 receives the speech sub-band signals $c_s(k)$ and the noise-corrupted sub-band signals $c_n(k)$ as classified by the classifier module 410. As described in more detail with regard to FIGS. 7A and 7B, the replacement estimator module 415 reconstructs (i.e. replaces) the noise-corrupted transform values $S_n(k)$ to emulate speech which is obscured by the noise. Replacement transform values $S'_n(k)$ for replacement noise-corrupted sub-band signals $c'_n(k)$ are based on speech features extracted from the speech transform values $S_s(k)$ of the speech sub-band signals $c_s(k)$.

The speech sub-band signals $c_s(k)$ and the replacement noise-corrupted sub-band signals $c'_n(k)$ are provided to the reconstructor module 420. The replacement noise-corrupted sub-band signals $c'_n(k)$ in conjunction with the speech sub-band signals $c_s(k)$ are utilized to perform an inverse transformation back into the time-domain to form modified acoustic signal c"(t). The modified acoustic signal c"(t) is then provided to the ASR module 318.

In the illustrated embodiment, the speech sub-band signals $c_s(k)$ and the replacement noise-corrupted sub-band signals $c'_n(k)$ are in the cochlea domain, and thus the reconstructor module 420 performs a transformation from the cochlea domain back into the time-domain. The transformation may include adding the speech sub-band signals $c_s(k)$ and the replacement noise-corrupted sub-band signals $c'_n(k)$ and may further include applying gains and/or phase shifts to the sub-band signals prior to the addition. In some embodiments, additional post-processing of the modified acoustic signal c"(t) may be performed.

In the illustrated example, the speech sub-band transform values $S_s(k)$ are not reconstructed, and thus are provided as is to the reconstructor module 420. In such a case, there may be a discontinuity between the speech transform values $S_s(k)$ and the replacement transform values $S'_n(k)$. Thus, in some embodiments, the transform values S(k) may be replaced with an approximate transform domain representation $\hat{S}(k)$ of the transform values S(k) which can prevent this discontinuity. This is described in more detail below with respect to FIGS. 7A and 7B.

Figure 4B:
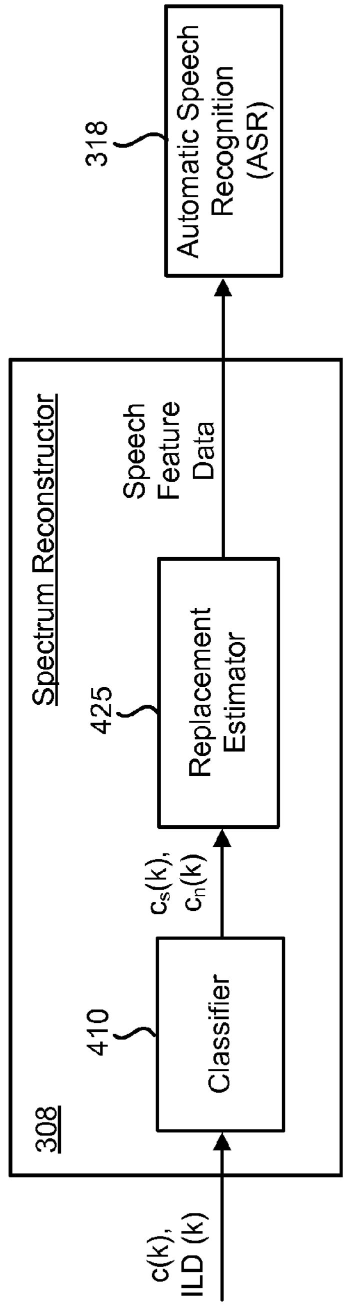
FIG. 4B is a second block diagram of an exemplary spectrum reconstruction module for transform domain reconstruction.

FIG. 4B is a second block diagram of an exemplary spectrum reconstructor module 316. The spectrum reconstructor module 316 includes the classifier module 410 and a replacement estimator module 425. In contrast to FIG. 4A, in FIG. 4B, the replacement estimator module 425 extracts speech feature data based on the speech transform values $S_s(k)$, instead of forming modified acoustic signal c"(t). The speech feature data may for example be cepstral coefficients (described below) which closely represent the speech transform values $S_s(k)$. The speech feature data is then provided to the ASR module 318 to perform speech recognition.

Figure 6:
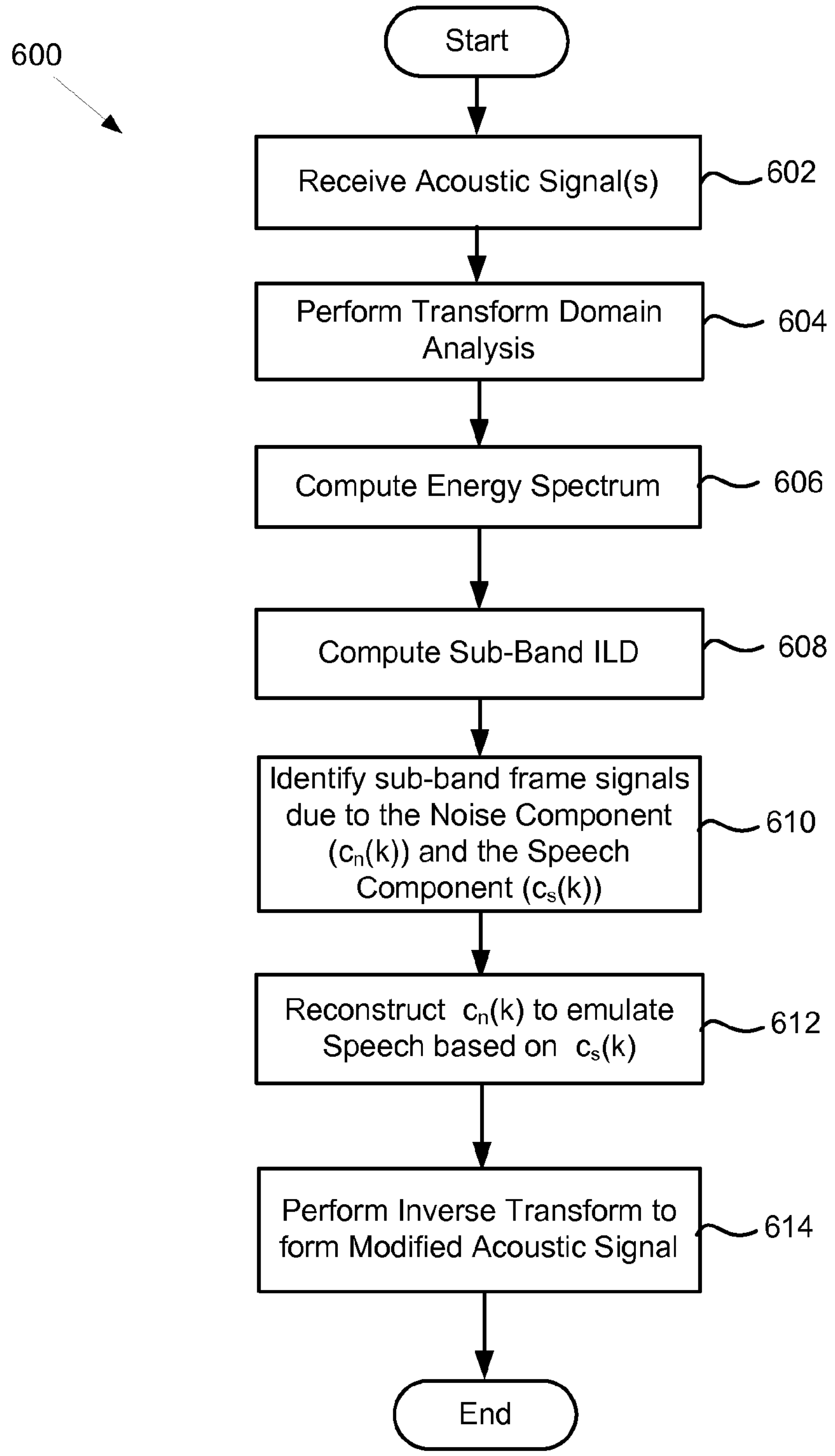
FIG. 6 is a flow chart of an exemplary method for performing transform domain reconstruction of an acoustic signal.

FIG. 6 is a flow chart of an exemplary method for performing transform domain reconstruction of an acoustic signal. As will all flow charts herein, in some embodiments some of the steps in FIG. 6 may be combined, performed in parallel or performed in a different order. The method of FIG. 6 may also include additional or fewer steps than those illustrated.

In step 602, the primary acoustic signal c(t) is received by the primary microphone 106. In the illustrated embodiment, the secondary acoustic signal f(t) is also received by the secondary microphone 108. It should be noted that embodiments of the present technology may practiced utilizing only the primary acoustic signal c(t). In some embodiments, acoustic signals are received from more than two microphones. In exemplary embodiments, the primary and secondary acoustic signals c(t) and f(t) are converted to digital format for processing.

In step 604, transform domain analysis is performed on the primary acoustic signal c(t) and the secondary acoustic signal f(t). The transform domain analysis transforms the primary acoustic signal c(t) into a transform domain representation given by the primary sub-band frame signals c(k) having corresponding transform coefficients S(k). Similarly, the secondary acoustic signal f(t) is transformed into secondary sub-band frame signals f(k). The sub-band frame signals may for example be in the fast cochlea transform (FCT) domain, or as another example in the fast Fourier transform (FFT) domain. Other transform domain representations may alternatively be used In step 606, energy spectrums for the sub-band frame signals are computed. Once the energy estimates are computed, sub-band ILD(k) are computed in step 608. In one embodiment, the sub-band ILD(x) is calculated based on the energy estimates (i.e. the energy spectrum) of both the primary and secondary sub-band frame signals c(k) and f(k).

In step 610, the noise-corrupted sub-band signals $c_n(k)$ and the speech sub-band signals $c_s(k)$ within the primary sub-band frame signals c(k) are identified. In the illustrated embodiment, the determination of whether a primary sub-band frame signal c(k) is noise-corrupted is based on the sub-band ILD(k) for that sub-band. Alternatively, other techniques may be used to determine whether to classify a primary sub-band frame signal c(k) as speech or noise-corrupted. For example, the determination may be made based on an estimated speech-to-noise ratio (SNR) for that sub-band.

In step 612, the noise-corrupted transform values $S_n(k)$ of the replacement noise-corrupted sub-band signals $c'_n(k)$ are reconstructed to emulate speech which is obscured by the noise. The replacement transform values $S'_n(k)$ are based on characteristics of the speech transform values $S_s(k)$ of the speech sub-band signals $c_s(k)$. Exemplary transform domain reconstruction processes are described below with respect to FIGS. 7A and 7B.

In step 614, the replacement noise-corrupted sub-band signals $c'_n(k)$ in conjunction with the speech sub-band signals $c_s(k)$ are utilized to perform an inverse transformation back into the time-domain to form modified acoustic signal c"(t).

Figure 7A:
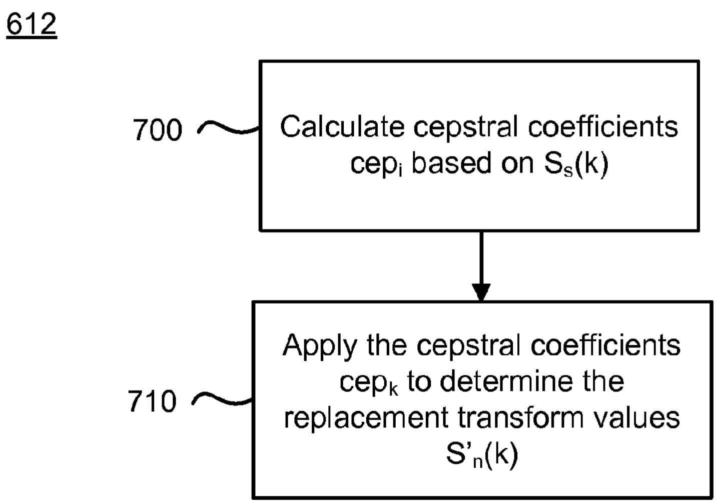
FIG. 7A is a flow chart of a first exemplary method for performing transform domain reconstruction.

FIG. 7A is a flow chart of a first exemplary method for performing transform domain reconstruction.

In step 700, a plurality of cepstral coefficients $cep_i$ are computed based on the speech transform values $S_s(k)$ of the speech sub-band signals $c_s(k)$. The cepstral coefficients $cep_i$ form an approximate transform domain representation $\hat{S}(k)$ of the transform values S(k) of the primary sub-band frame signals c(k). In the illustrated embodiment, the cepstral coefficients $cep_i$ are computed for each particular time frame corresponding to that of the transform values S(k) being approximated. Thus, the computed cepstral coefficients $cep_i$ can change over time, including from one frame to the next.

For a spectrum in a particular time frame given by transform values S(k), cepstral coefficients $cep_i$ are coefficients of a cosine series that approximate S(k). This can be represented mathematically as:

$$\hat{S}(k) = \sum_{i=0}^{I-1} cep_i \cdot \cos\frac{2\pi \cdot k \cdot i}{L} \qquad (1)$$

where I is the number of cepstral coefficients $cep_i$ used to represent the approximate spectrum $\hat{S}(k)$, and L is the number of primary sub-band frame signals c(k). The number I of cepstral coefficients $cep_i$ can vary from embodiment to embodiment. For example I may be 13, or as another example may be less than 13. In exemplary embodiments, L is greater than or equal to I, so that a unique solution can be found. Exemplary techniques for computing the cepstral coefficients $cep_i$ are described below.

In step 710, the computed cepstral coefficients $cep_i$ are then applied to the transform domain representation given by the noise-corrupted sub-band frame signals $c_n(k)$ to determine the replacement transform values $S'_n(k)$ to emulate speech obscured by the noise. In the illustrated embodiment the replacement transform values $S'_n(k)$ are computed using equation (1) above, for $k \in c_s(k)$. In such a case, there may be a discontinuity between the speech transform values $S_s(k)$ and the replacement transform values $S'_n(k)$. Thus, in some embodiments, rather than just replacing the noise-corrupted portions, the entire spectrum may be replaced with the approximate transform domain representation $\hat{S}(k)$ given by equation (1) above, or by a linear combination of the two.

Various techniques can be used to compute the cepstral coefficients $cep_i$ in step 700. In one embodiment, the cepstral coefficients $cep_i$ are calculated to minimize a least squares difference between $\hat{S}(k)$ and S(k) for the transform domain representation given by the speech sub-band signals $c_s(k)$. In other words, the cepstral coefficients $cep_i$ are computed so that the $\hat{S}(k)$ is close to S(k) in the portions which contain speech. This can be represented mathematically as a minimum of:

$$\sum_{k \in c_s(k)} \left|\hat{S}(k) - S(k)\right|^2 \qquad (2)$$

The solution to equation (1) given the constraints of equation (2) can be represented mathematically by:

$$\text{cep} = (W^t W)^{-1} W^t S \qquad (3)$$

where cep is a vector composed of the I cepstral coefficients $cep_i$, S is a vector composed of the J speech transform values $S_s(k)$ of the speech sub-band signals $c_s(k)$, and W is a J×I matrix whose elements are given by:

$$W_{m,n} = \cos\frac{2\pi \cdot n \cdot m}{L} \qquad (3)$$

In another embodiment, the replacement transform values $S'_n(k)$ are computed such that the sum of a group of cepstral coefficients $cep_i$ is a minimum. The group may include all of the I cepstral coefficients $cep_i$, or in an alternative embodiment may include a subset thereof. Specifically, the cepstral coefficients $cep_i$ can be represented mathematically as:

$$cep_i = \sum_{k=0}^{L-1} (S_s(k) + S'_n(k))\cos\frac{2\pi \cdot k \cdot i}{L} \qquad (4)$$

Equation (4) can then be solved for the replacement transform values $S'_n(k)$, such that the following is a minimum:

$$\sum_{i=0}^{I-1} |cep_i| \qquad (5)$$

In Equation (5) above all I of the cepstral coefficients $cep_i$ are included. Alternatively, a subset thereof may be used as mentioned above. The solution for the replacement transform values $S'_n(k)$ in equation (4), subject to the constraint of equation (5), can be solved for example using standard convex optimization (interior point methods for example) or by successive approximations. It should be noted that in some embodiments equation (5) can be replaced by a more general formula G(c), where c is a vector composed of the I cepstral coefficients $cep_i$ and G is a real positive function of c. For example, G could compute the first-order difference function over the cepstral coefficients. Depending on the nature of the function G, different optimization techniques may be used to obtain the replacement transform values $S'_n(k)$.

In an alternative embodiment, the solution for the replacement transform values $S'_n(k)$ in equation (4) may be solved such that the L0 norm of the cepstral coefficients $cep_i$ is minimized. The replacement transform values $S'_n(k)$ may be solved such that a maximum number of cepstral coefficients $cep_i$ are small, such as zero or below or below some predetermined threshold value. It should be noted that in some embodiments equation (4) may be replaced with a more general formula, which may be solved such that the L0 norm of the solution is minimized.

Figure 7B:
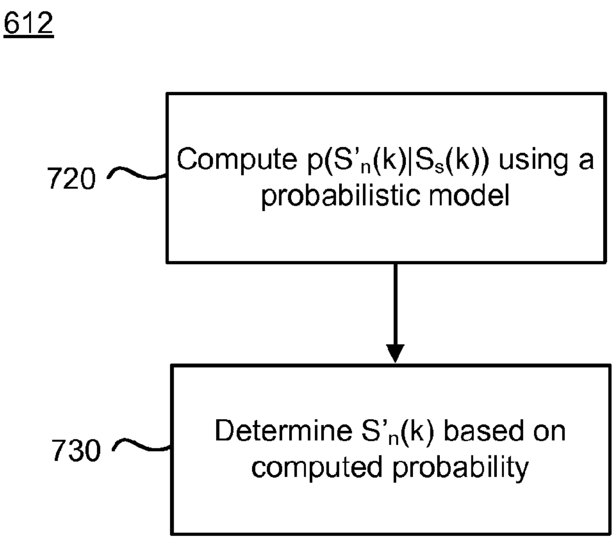
FIG. 7B is a flow chart of a second exemplary method for performing transform domain reconstruction.

FIG. 7B is a flow chart of a second exemplary method for performing transform domain reconstruction. The method in FIG. 7B makes use of a speech model stored in memory the audio device 104. The speech model may for example be trained on a database of utterances, or as another example using the audio devices own voice.

In step 720, the posterior probability of the replacement transform values $S'_n(k)$ is computed given the speech transform values $S_s(k)$ using a probabilistic model. This can be represented mathematically as:

$$p(S'_n(k)|S_s(k)) \qquad (6)$$

The posterior probability may be computed for example using a probabilistic model of the spectrum using clean utterances, denoted p(S(k)). This model may for example be purely frame-based (i.e., not using any prior frame history), or may be dependent on the previous frame(s). In embodiments, a frame based model can be well approximated by a mixture of Gaussians whose parameters are computed using the database of clean utterances. Alternatively, more complicated time-dependent models can be used such as those which take the form of a Hidden Markov Model, using Gaussian mixtures for the probability of the spectral data given a particular state, and classical state transition matrices.

The replacement transform values $S'_n(k)$ can then be computed at step 730 using for example classical Bayesian theory, such that the replacement transform values $S'_n(k)$ may be the Maximum a posteriori. That is, the computed replacement transform values $S'_n(k)$ can maximize equation (6) or the conditional expectation given by:

$$\int S_n'(k) \cdot p(S_n'(k)|S_s(k)) \cdot dS_s(k) \qquad (7)$$

In yet other alternative embodiments, the replacement transform values $S'_n(k)$ may be determined through the use of a codebook stored in memory in the audio device 104. The computed cepstral coefficients cep, may be compared to those of known utterances stored in the codebook to determine the closest entry of cepstral coefficients. The closest entry of cepstral coefficients may then be applied to the transform domain representation given by the noise-corrupted sub-band frame signals $c_n(k)$ to determine the replacement transform values $S'_n(k)$.

In other embodiments, the replacement transform values $S'_n(k)$ may be determined through the use of compressive sensing techniques carried out on the transform domain representation, or a subset thereof. Examples of various compressive sensing techniques which may be used are disclosed in Proceedings of the IEEE, Volume 98, Issue 6, June 2010.

The transform domain reconstruction techniques described herein can also be utilized to perform noise reduction within the primary acoustic signal to improve voice quality.

Figure 8:
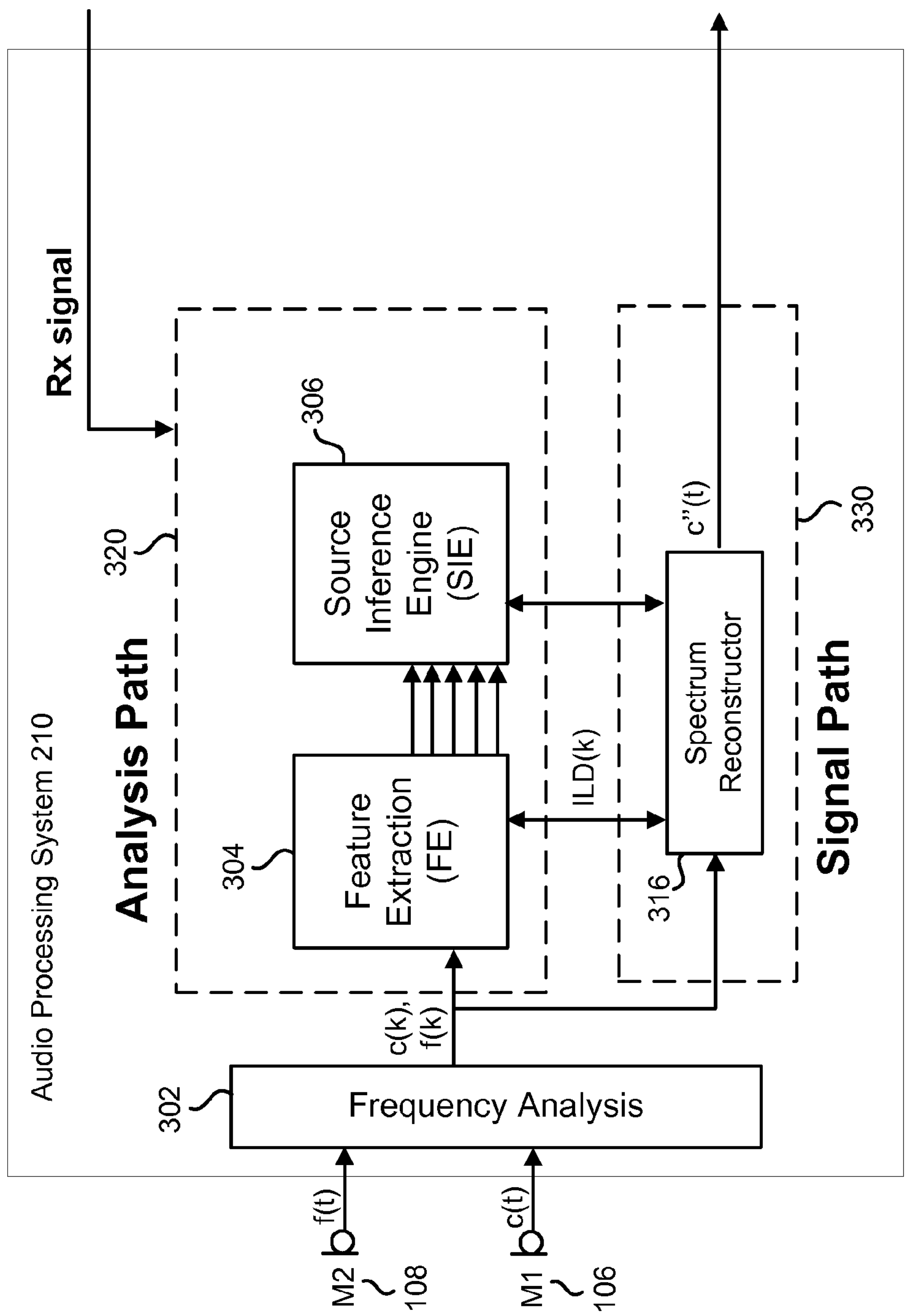
FIG. 8 is a block diagram of an exemplary audio processing system for performing transform domain reconstruction as described herein to reduce noise in an acoustic signal.

FIG. 8 is a block diagram of an exemplary audio processing system 210 for performing transform domain reconstruction to reduce noise in the primary acoustic signal c(t). In exemplary embodiments, the audio processing system 210 is embodied within a memory device within audio device 104. The audio processing system 210 may include the frequency analysis module 302, the feature extraction module 304, and the reconstructor module 314. Audio processing system 210 may include more or fewer components than those illustrated in FIG. 8, and the functionality of modules may be combined or expanded into fewer or additional modules.

As shown in FIG. 8, the spectrum reconstructor module 316 is implemented with the signal path sub-system 330. The spectrum reconstructor module 316 receives the sub-band ILD(k) and the primary sub-band signals c(k). Using the techniques described herein, the spectrum reconstructor module 316 uses the sub-band ILD(k) to identify noise-corrupted sub-band signals $c_n(k)$ and perform transform domain reconstruction as described herein. The replacement noise-corrupted sub-band signals $c'_n(k)$ in conjunction with the speech sub-band signals $c_s(k)$ are utilized to perform an inverse transformation back into the time-domain to form modified acoustic signal c"(t), wherein the noise has been reduced. The modified acoustic signal c"(t) may then be provided to a codec for encoding and subsequent transmission by the audio device 104 to a far-end environment via a communications network. As another example, the modified acoustic signal c"(t) may be provided as an audio output via output device 206.

The above described modules may be comprised of instructions that are stored in a storage media such as a machine readable medium (e.g., computer readable medium). These instructions may be retrieved and executed by the processor 202. Some examples of instructions include software, program code, and firmware. Some examples of storage media comprise memory devices and integrated circuits. The instructions are operational.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for transform domain reconstruction of an acoustic signal, the method comprising:

receiving the acoustic signal having a speech component and a noise component;

transforming the acoustic signal into a plurality of transform domain components having corresponding transform values;

identifying a first set of transform domain components in the plurality of transform domain components having transform values which are based on the speech component;

replacing transform values of a second set of transform domain components not identified as being based on the speech component with replacement transform values to produce a third set of transform domain components, the replacing including:

calculating a plurality of cepstral coefficients based at least in part on a spectrum of the acoustic signal to form an approximate transform domain representation of the first set of transform domain components, wherein calculating the plurality of cepstral coefficients includes computing a second approximate transform domain representation of the transform domain represented by the second set of transform domain components, the second approximate transform domain representation computed to minimize a sum of a group of cepstral coefficients in the plurality of cepstral coefficients; and determining the replacement transform values by applying the plurality of cepstral coefficients to the transform domain represented by the second set of transform domain components;

producing a modified signal based at least on adding the first and the third sets of transform domain components; and inverse transforming the modified signal from the transform domain to a time domain to produce a modified acoustic signal, the modified acoustic signal configured for processing by an automatic speech recognition system.

2. The method of claim 1, wherein identifying the first set of transform domain components is based on an estimated signal-to-noise ratio of corresponding portions of the acoustic signal.

3. The method of claim 1, further comprising receiving a second acoustic signal, and wherein identifying the first set of transform domain components is based on a difference between the acoustic signal and the second acoustic signal.

4. The method of claim 1, further comprising:

analyzing the modified acoustic signal to determine an utterance in the speech component.

5. The method of claim 1, further comprising analyzing the plurality of cepstral coefficients to determine an utterance in the speech component.

6. The method of claim 1, wherein calculating the plurality of cepstral coefficients further comprises minimizing a least squares difference between the approximate transform domain representation and an actual transform domain representation given by the first set of transform domain components.

7. The method of claim 1, wherein replacing the transform values of the second set of transform domain components with the replacement transform values comprises determining the replacement transform values using a probabilistic model trained on a database of utterances.

8. The method of claim 1, wherein producing the modified signal includes applying at least one of a gain and a phase shift to one or more of the first and the third sets of transform domain components prior to the adding.

9. A system for transform domain reconstruction of an acoustic signal, the system comprising:

a microphone to receive the acoustic signal having a speech component and a noise component;

a transform module to transform the acoustic signal into a plurality of transform domain components having corresponding transform values;

a reconstructor module to:

identify a first set of transform domain components in the plurality of transform domain components having transform values which are based on the speech component;

calculate a plurality of cepstral coefficients based at least in part on a spectrum of the acoustic signal to form an approximate transform domain representation of the first set of transform domain components;

compute a second approximate transform domain representation of the transform domain represented by the second set of transform domain components, the second approximate transform domain representation computed to minimize a sum of a group of cepstral coefficients in the plurality of cepstral coefficients;

determine replacement transform values by applying the plurality of cepstral coefficients to the transform domain represented by the second set of transform domain components;

replace transform values of a second set of transform domain components not identified as being based on the speech component with the replacement transform values to produce a third set of transform domain components; and produce a modified signal based at least on adding the first and the third sets of transform domain components; and an inverse transform module to inverse transform the modified signal from the transform domain to a time domain to produce a modified acoustic signal, the modified acoustic signal configured for processing by an automatic speech recognition system.

10. The system of claim 9, wherein the reconstructor module identifies the first set of transform domain components based on an estimated signal-to-noise ratio of corresponding portions of the acoustic signal.

11. The system of claim 9, further comprising a second microphone to receive a second acoustic signal, and wherein the reconstructor module identifies the first set of transform domain components based on a difference between the acoustic signal and the second acoustic signal.

12. The system of claim 9, wherein the reconstructor module further comprises an automatic speech recognition module to analyze the modified acoustic signal to determine an utterance in the speech component.

13. The system of claim 9, further comprising an automatic speech recognition module to analyze the plurality of cepstral coefficients to determine an utterance in the speech component.

14. The system of claim 9, wherein the reconstructor module further calculates the plurality of cepstral coefficients to minimize a least squares difference between the approximate transform domain representation and an actual transform domain representation given by the first set of transform domain components.

15. The system of claim 9, wherein the reconstructor module determines the replacement transform values using a probabilistic model trained on a database of utterances.

16. The system of claim 9, wherein producing the modified signal includes applying at least one of a gain and a phase shift to one or more of the first and the third sets of transform domain components prior to the adding.

17. A non-transitory computer readable storage medium having embodied thereon a program, the program being executable by a processor to perform a method for transform domain reconstruction of an acoustic signal, the method comprising:

receiving the acoustic signal having a speech component and a noise component;

transforming the acoustic signal into a plurality of transform domain components having corresponding transform values;

identifying a first set of transform domain components in the plurality of transform domain components having transform values which are based on the speech component;

replacing transform values of a second set of transform domain components for an entire spectrum with replacement transform values to produce a third set of transform domain components, the replacing including:

calculating a plurality of cepstral coefficients based at least in part on a spectrum of the acoustic signal to form an approximate transform domain representation of the first set of transform domain components, wherein calculating the plurality of cepstral coefficients includes computing a second approximate transform domain representation of the transform domain represented by the second set of transform domain components, the second approximate transform domain representation computed to minimize a sum of a group of cepstral coefficients in the plurality of cepstral coefficients; and determining the replacement transform values by applying the plurality of cepstral coefficients to the transform domain represented by the second set of transform domain components;

producing a modified signal based at least on adding the first and the third sets of transform domain components; and inverse transforming the modified signal from the transform domain to a time domain to produce a modified acoustic signal, the modified acoustic signal configured for processing by an automatic speech recognition system.

18. The non-transitory computer readable storage medium of claim 17, wherein producing the modified signal includes applying at least one of a gain and a phase shift to one or more of the first and the third sets of transform domain components prior to the adding.

* * * * *